(No Model.)

W. MARTIN.
HOSE COUPLING.

No. 525,855. Patented Sept. 11, 1894.

WITNESSES.
F. Einfeldt
A. L. Jackson

INVENTOR.
William Martin
By J. Sturgeon
Att'y.

UNITED STATES PATENT OFFICE.

WILLIAM MARTIN, OF DUNKIRK, NEW YORK.

HOSE-COUPLING.

SPECIFICATION forming part of Letters Patent No. 525,855, dated September 11, 1894.

Application filed July 16, 1894. Serial No. 517,686. (No model.) Patented in Canada May 29, 1894, No. 46,188.

*To all whom it may concern:*

Be it known that I, WILLIAM MARTIN, a citizen of the United States, residing at Dunkirk, in the county of Chautauqua and State of New York, have invented certain new and useful Improvements in Hose-Couplings, (embodied in part in Letters Patent No. 46,188, granted to me by the Dominion of Canada May 29, 1894;) and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in hose couplings, hereinafter described and claimed, and illustrated in the accompanying drawings, in which—

Figure 1:
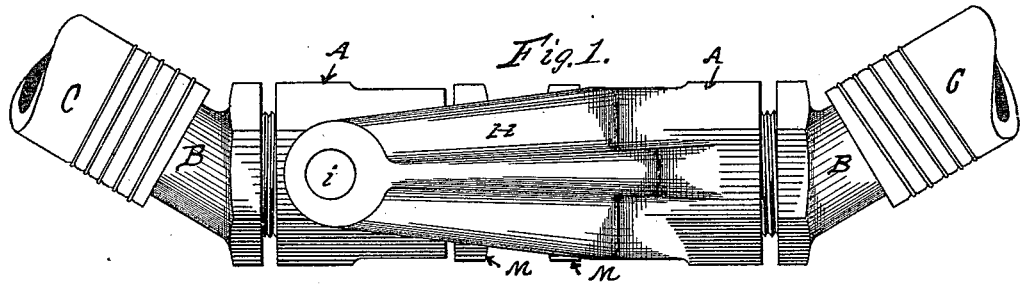
Figure 2:
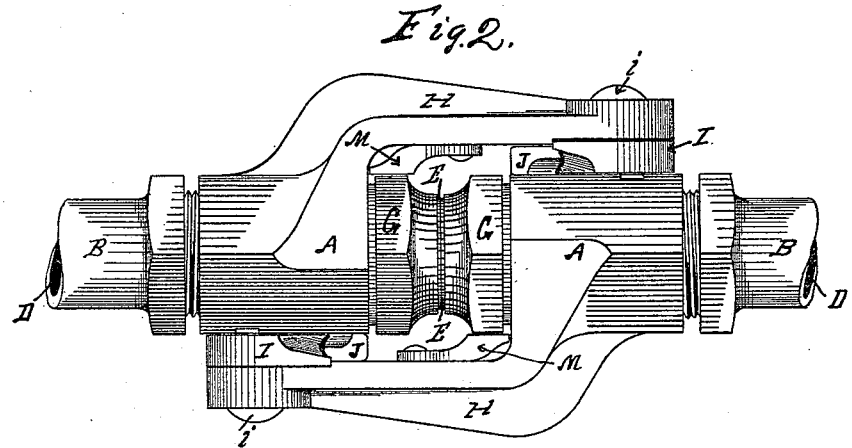
Figure 3:
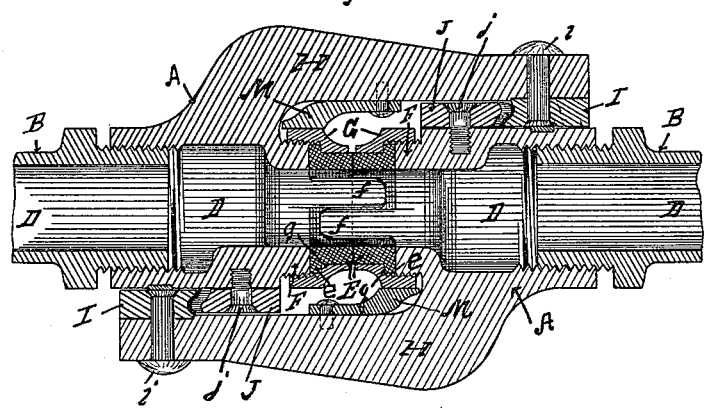
Figure 4:
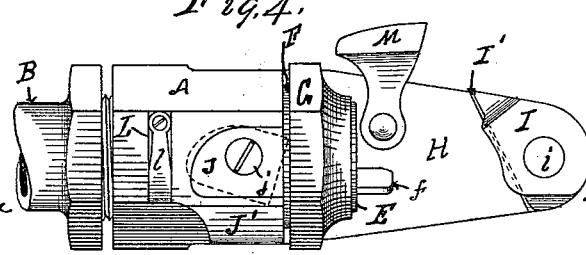

Figure 1. is a side elevation of my improved hose coupling. Fig. 2. is a top or plan view of the same. Fig. 3. is a horizontal central section of the same. Fig. 4. is a side elevation of one half or section of the coupling.

My improved hose coupling is designed especially for coupling steam or air brake hose between the ends of railway cars, and my invention consists of certain improvements in the hose coupling described and claimed in my application for a patent, Serial No. 459,569, filed January 24, 1893.

In the construction of my invention illustrated in the accompanying drawings, the coupling consists of two like halves or sections, of each of which A is the body and B a hose nipple thereon, through which parts there is a central straight way passage D forming a continuance of the passage through the hose sections C secured to said nipples. The meeting face of each half or section of the coupling consists of an annular packing ring E made preferably of some resilient substance, which is seated against the outer end of an annular flange or nipple F, which projects outwardly from the face of the body A. This flange or nipple F is screw threaded on its periphery, so as to receive a sleeve nut G which passes over the packing ring E, an inner annular flange $g$ thereon engaging with an annular flange $e$ on the lower end of the packing ring E, and retaining the packing ring in place, so that the flange or nipple F and the packing ring E form the continuation and junction of the passage way D in each half of the coupling, as illustrated in Fig. 3.

Upon the bottom of the inside of each flange or nipple F is secured a tongue or guide $f$, which extends outwardly through the packing ring E thereon, and is long enough to project some distance into the packing ring E on the other section when the two halves of the coupling are brought together. This tongue or guide $f$ is located far enough to one side of the center of the flange or nipple F, so that as the two halves or sections of the coupling are brought together, the adjacent edges of the tongues or guides $f$ on each section pass each other, and the adjacent edges thereof are in close contact, as illustrated in Fig. 3. These tongues operate as guides, and also operate to retain the sections of the coupling in line and prevent leakage, should the locking mechanism on either side of the coupling become inoperative.

Upon one side of each body section A is an arm H which extends forward from one side of the face of said body section A far enough to pass along the side of the duplicate body section A, when said sections are brought together, and on the inner face of the end of the arm H, there is pivoted an eccentric cam faced locking plate I, the movement of which plate is limited by its being in a slight depression I' in the face of the arm H, as illustrated in Fig. 4, and on the side of the corresponding body A is pivoted an eccentric cam faced locking plate J, the movement of which plate is limited by a shoulder J' on the body A, as illustrated in Fig. 4. These two eccentric locking plates are each undercut, as illustrated in Fig. 3, so that when interlocked, any sidewise movement is prevented. The meeting edges of the locking plates I and J are also cam shaped, so that when the locking plate I is pressed down upon the locking plate J, the plates rock upon their pivots $i$ and $j$, and operate to draw the halves or sections of the coupling longitudinally toward each other, so as to bring the faces of the packing rings E, E, firmly together and prevent leakage. In the side of each body A, behind the locking plate J, there is a vertical recess L, within which is secured a bow spring $l$, which is depressed by contact with the inner face of the locking plate I, when the parts of the coupling are interlocked, and operates by frictional contact to prevent the locking plate I from being disengaged from the locking plate J by the vibration of the parts of the coupling upon each other.

Another feature of my invention consists in providing suitable means for preventing the sleeve nuts G, which hold the packing rings E in place, from working loose. For this purpose I preferably use a dog M pivoted to the inner face of the arm H, as illustrated in Fig. 4, so that it will pass down between the periphery of the nut G and the inner face of the arm H, and be retained in that position by gravity, as illustrated in Figs. 2 and 3. By this means I am enabled to have the sleeve nuts G screw onto the nipples F very loosely, so that they can be taken off and replaced without a wrench, when necessary to replace defective packing rings E by new ones, and while I prefer a dog as described, I do not limit myself to this exact construction, as I can use other convenient means for securing the nut G in place.

Having thus described my invention, so as to enable others to construct and use the same, what I claim as new, and desire to secure by Letters Patent of the United States, is—

1. In a hose coupling member having a continuous straight-way passage therethrough, a meeting face on the body of said member consisting substantially of an annular packing ring seated on the end of an annular flange or nipple projecting forward from the outer end of said body and forming the outer portion of said straight-way passage, a sleeve nut annularly embracing said packing ring and also engaging a screw thread on the periphery of said flange or nipple, a longitudinal arm projecting forward from the body of the coupling member at one side of and beyond the meeting face thereof, adapted to engage and interlock with the body of a duplicate member of the coupling, and locking mechanism on said arm adapted to engage and lock said sleeve nut upon said flange or nipple, substantially as and for the purpose set forth.

2. In a hose coupling member having a continuous straight-way passage therethrough, a meeting face on the body of said member consisting substantially of an annular packing ring seated on the end of an annular flange or nipple projecting forward from the outer end of said body and forming the outer portion of said straight-way passage, a sleeve nut annularly embracing said packing ring and also engaging a screw thread on the periphery of said flange or nipple, a longitudinal arm projecting forward from the body of the coupling member at one side of and beyond the meeting face thereof, adapted to engage and interlock with the body of a duplicate member of the coupling, and a dog mounted in the inner face of said arm adapted to engage the periphery of said sleeve nut and lock it in place upon said flange or nipple, substantially as and for the purpose set forth.

3. In a hose coupling member, having a continuous straight-way passage therethrough, a meeting face on the body of said member consisting substantially of an annular packing ring seated on the end of an annular flange or nipple projecting forward from the outer end of said body and forming the outer portion of said straight-way passage, a sleeve nut annularly embracing said packing ring and also engaging a screw thread on the periphery of said flange or nipple, an eccentric cam-faced locking plate pivoted to one side of the body of said coupling member, and an arm on the opposite side thereof, projecting forward longitudinally beyond the meeting face of said coupling member, an eccentric cam-faced locking plate pivoted to the inner face of the end of said arm and adapted to engage and interlock with the eccentric cam-faced locking plate on the body of a duplicate coupling member, and a dog pivoted to the inner face of said arm and adapted to be swung into position between the inner face of said arm and the adjacent side of the sleeve nut securing the packing ring, forming the meeting face of said coupling member, upon the end of the flange or nipple on which it is seated, substantially as and for the purpose set forth.

4. In a hose coupling consisting of two like sections, each having a continuous straight way passage therethrough, an arm extending forward from the face of each section at one side of said opening, and adapted to interlock with a duplicate section a meeting face on each section and a tongue or guide in the bottom of each section adapted to extend into the meeting face of the duplicate section, so that when two sections of said coupling are brought together, the adjacent edges of said tongues or guides will be in close contact with each other, substantially as and for the purpose set forth.

5. In a hose coupling consisting of two like sections, each having a continuous straight way passage therethrough, an arm projecting forward from the face of each section at one side of said opening, so as to extend past the side of a duplicate section when two sections are brought together, a cam shaped oscillating locking plate pivoted to said arm and adapted to engage an oscillating cam shaped locking plate pivoted to the side of the body of the duplicate section, and a spring on the side of the body adapted to engage the locking plate on the arm of the duplicate section, substantially as set forth.

In testimony whereof I affix my signature in presence of two witnesses.

WILLIAM MARTIN.

Witnesses:
  GEO. E. SEVEY,
  GEO. A. STARR.